Figure 11:
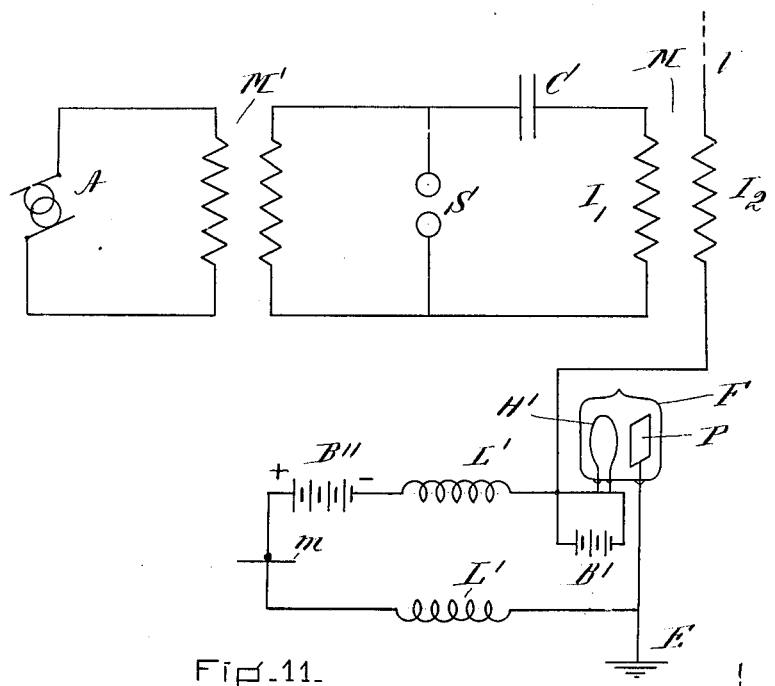

L. DE FOREST.
SPACE TELEGRAPHY.
APPLICATION FILED JAN. 29, 1907.
943,969.
Patented Dec. 21, 1909.
5 SHEETS—SHEET 1.
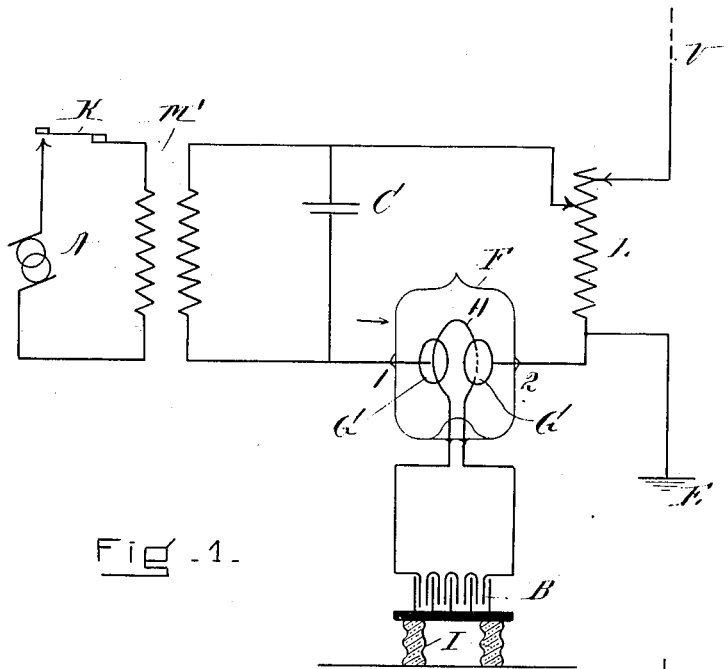
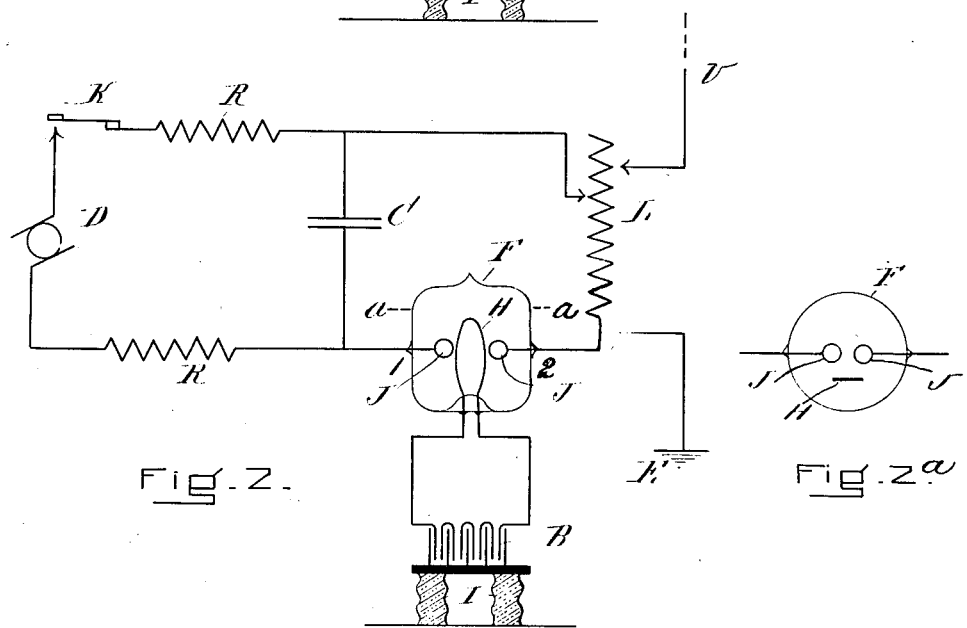

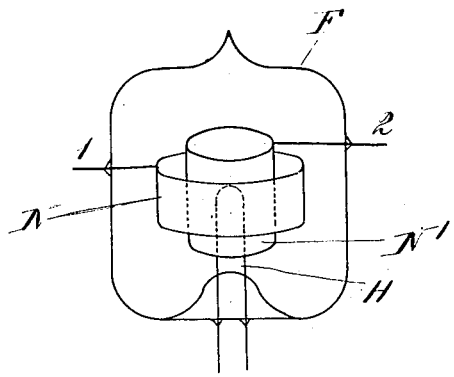
Fig. 3.
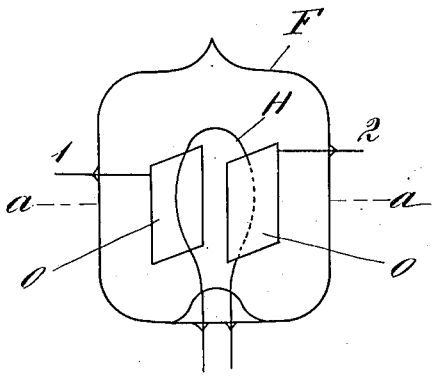
Fig. 4.
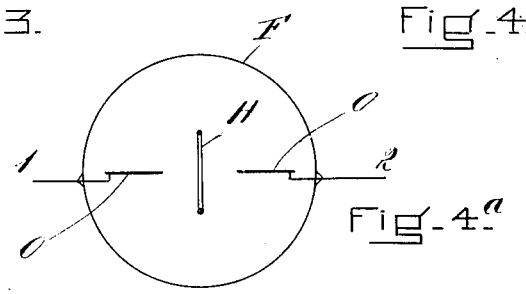
Fig. 4ª.
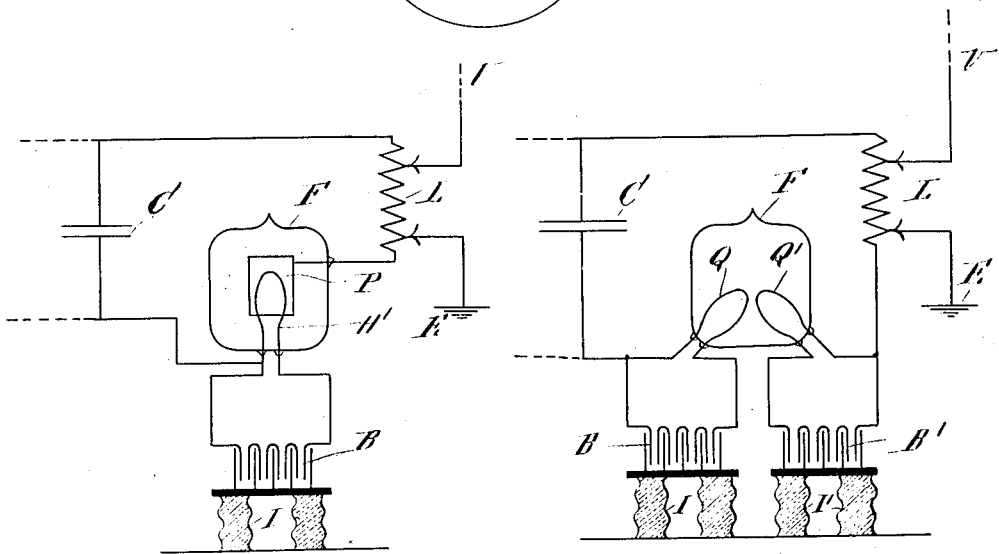
Fig. 5.    Fig. 6.

L. DE FOREST.
SPACE TELEGRAPHY.
APPLICATION FILED JAN. 29, 1907.
943,969.
Patented Dec. 21, 1909.
5 SHEETS—SHEET 3.
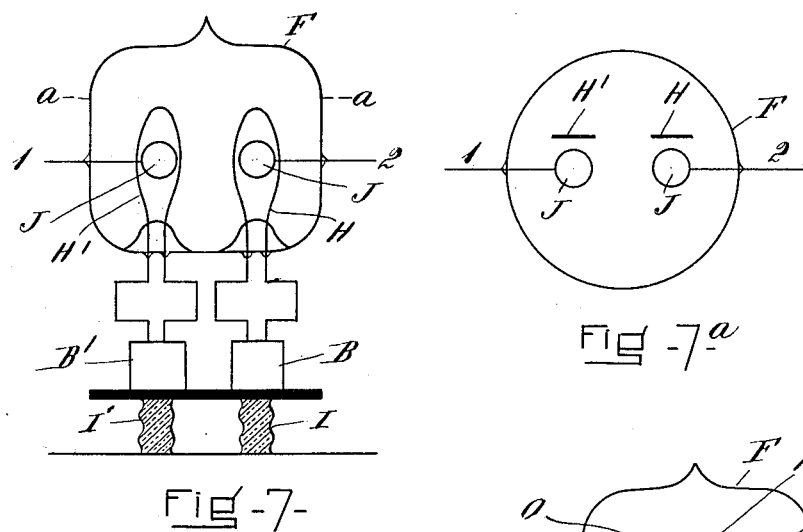
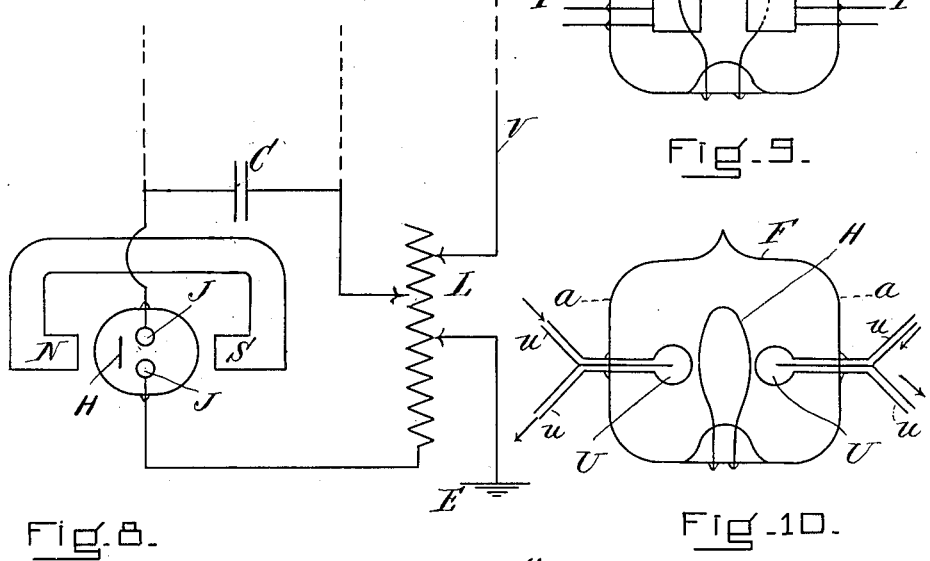
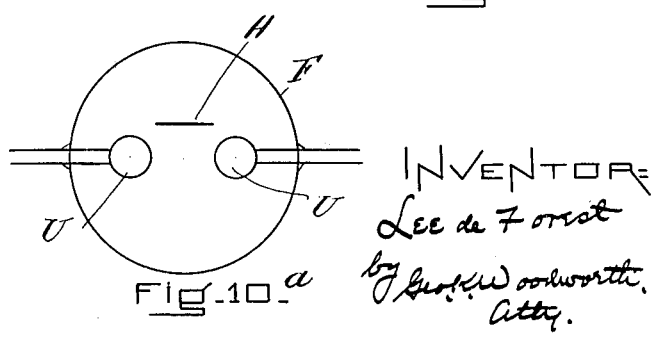

L. DE FOREST.
SPACE TELEGRAPHY.
APPLICATION FILED JAN. 29, 1907.
943,969.
Patented Dec. 21, 1909.
5 SHEETS—SHEET 5.
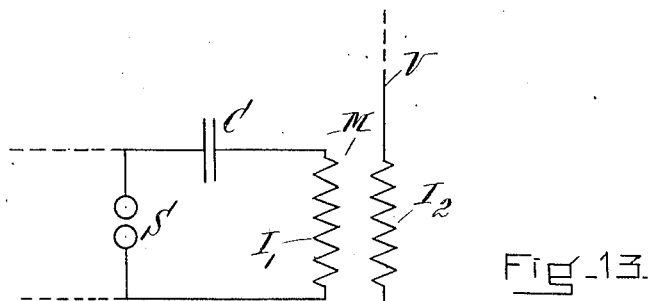
Fig. 13.
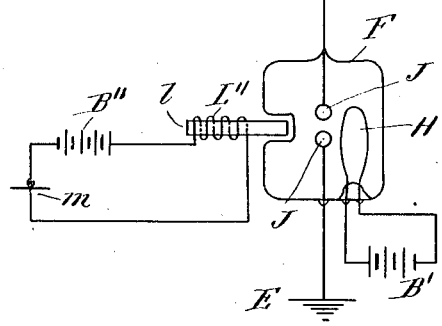
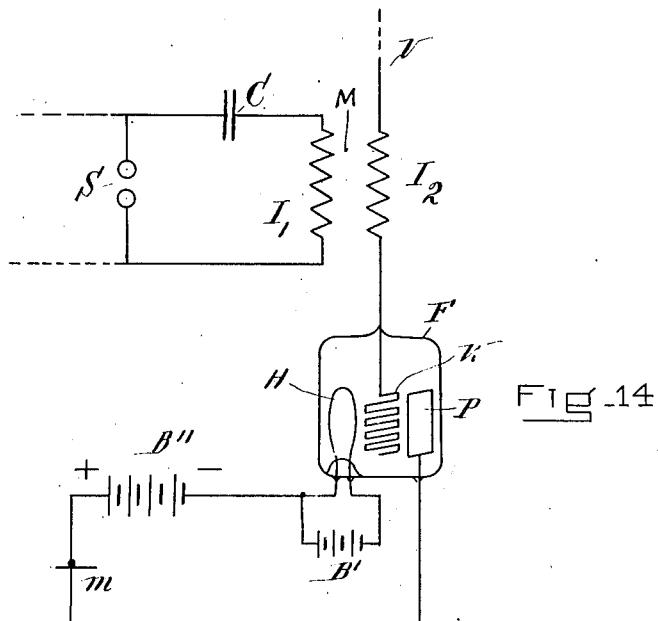
Fig. 14.
WITNESSES:
E. B. Tomlinson
Patrick J. Conroy
INVENTOR:
Lee de Forest
by Geo. K. Woodworth
Atty.

UNITED STATES PATENT OFFICE.

LEE DE FOREST, OF NEW YORK, N. Y., ASSIGNOR, BY MESNE ASSIGNMENTS, TO DE FOREST RADIO TELEPHONE CO., A CORPORATION OF NEW YORK.

SPACE TELEGRAPHY.

943,969.  
Specification of Letters Patent.  Patented Dec. 21, 1909.

Application filed January 29, 1907. Serial No. 354,663.

*To all whom it may concern:*

Be it known that I, LEE DE FOREST, a citizen of the United States, and a resident of New York, in the county of New York and State of New York, have invented a new and useful Improvement in Space Telegraphy, of which the following is a specification.

The present invention relates to space telegraph or telephone transmitting systems. The object of the invention is to provide a discharger for a circuit, open or closed, containing an electrical capacity, an electrical condenser or other capacity, which shall be of very low electrical resistance after the prime discharge, which shall permit of a regular and constant spark-frequency, and which shall have certain other advantages hereinafter set forth.

With this object in view my invention consists essentially of an evacuated vessel inclosing two electrodes, together with means for maintaining between said electrodes a condition of high ionic conductivity.

In the drawings which accompany and form a part of this specification I have illustrated in diagram several embodiments of the discharger which constitutes the subject matter of my invention and several arrangements of circuits showing how said discharger may be employed in practice.

Figure 12:
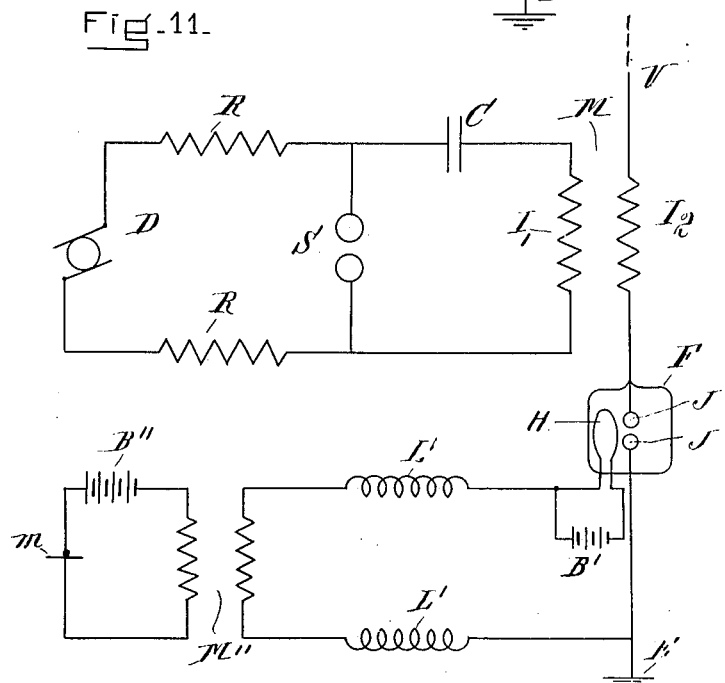

In the drawings Figures 1, 2, 5, 6, 8, 11, 12, 13 and 14 represent electromagnetic wave radiating systems. Fig. 1ª represents a side elevation of the discharger shown in Fig. 1 looking in the direction of the arrow. Fig. 2ª is a section of the discharger shown in Fig. 2 taken on the line *a—a*. Fig. 3 represents partly in perspective and partly in diagram a modified form of discharger. Fig. 4 represents partly in perspective and partly in diagram another modification of said discharger. Fig. 4ª is a section taken on the line *a—a* of Fig. 4. Fig. 5 is a diagrammatic view showing a radiating system wherein a single electrode is associated with a filament within the evacuated vessel. Fig. 6 is a similar view showing two filaments in the evacuated vessel. Fig. 7 is an elevation of still another modification. Fig. 7ª is a section taken on the line *a—a* of Fig. 7. Fig. 9 represents substantially the same type of discharger shown in Fig. 4 provided with means for maintaining a constant temperature within the evacuated vessel. Fig. 10 represents substantially the same type of discharger shown in Fig. 2 provided with means for maintaining a constant temperature within the evacuated vessel. Fig. 10ª is a section taken on the line *a—a* of Fig. 10. Fig. 11 is a diagrammatic view showing a radiating system showing the discharger in the ground connection of the antenna system. Fig. 12 is a view similar to Fig. 11 showing a modified arrangement of radiating system with the discharger in the antenna circuit. Fig. 13 is a similar view showing a magnet associated with the discharger. Fig. 14 is a similar view showing a grid electrode associated with a plate electrode and a filament in the evacuated vessel.

In the figures, V is an antenna, L is an inductance, E is an earth connection, M M' and M'' are transformers, C is a condenser, K is a key, *m* is a microphonic transmitter, A is a source of vibratory electromotive force, D is a source of unidirectional electromotive force, S is a spark-gap, R is a resistance, B, B', B'' are batteries, I is an insulator, and L' is a choke-coil.

In Fig. 1, F is an evacuated vessel of glass or other suitable material in which are sealed two electrodes G G which as shown are plates. The filament H which may be sealed in said vessel F in the usual manner is arranged with its plane normal to the axis of the electrodes and is of a sufficiently large diameter to prevent the discharge of the condenser C across the gap between G G from striking the same. The filament H is heated preferably to incandescence by the batteries B which preferably are insulated by the insulators I.

In Fig. 2 the spark electrodes J J are shown as spheres and the filament H is arranged at one side of the axis of said electrodes with its plane parallel to said axis. Preferably the distance between the filament and the electrodes is greater than the distance between the electrodes themselves.

In Fig. 3, the electrodes N N' are shown as concentric cylinders and the filament H may be placed inside the inner cylinder N'.

In Fig. 4, the electrodes O O are plates of platinum or other suitable material, arranged end-on and the filament H is arranged as shown with its plane normal to the plane of said plates and with its two sides arranged on either side of the gap intervening between the adjacent edges of said plates.

In Fig. 5, the electrode P is a plate of platinum or other suitable metal and the electrode H' is a very heavy filament preferably of metal coated with an oxid of an alkali metal.

In Fig. 6, both electrodes are formed of very heavy filaments Q Q' which are heated respectively by the batteries B B' insulated by the insulators I I'.

In Fig. 7, the electrodes are shown as spheres J J and two filaments H H' are provided, each adjacent to a different one of said spheres.

In Fig. 8, in which is shown in plan view substantially the same discharger which is shown in Fig. 2, the magnet N—S is arranged to deflect the ionic stream produced by heating the electrode H across the gap between the electrodes J J.

In Fig. 9, which shows substantially the same discharger which is illustrated in Fig. 4, the spines T T are connected to the plates O O and project outside the vessel F so as to increase the radiation of heat from the interior of the vessel and thereby maintain the temperature of said interior as constant as may be.

In Fig. 10, the electrodes U U are hollow pipes provided with two passage-ways $u$ $u$ for water or other cooling liquid to the end that the temperature of the interior of the vessel F may be regulated.

In Fig. 1, the circuit C L G G is the usual oscillation circuit of a space telegraph transmitting system, the condenser C of which is charged by the alternating or vibratory current developed by the generator A and discharges across the gap between the electrodes G G, thereby setting up high frequency electrical oscillations, the energy of which may be translated to the antenna V in any suitable manner. I have found that by evacuating the vessel F and, preferably, by maintaining therein a very high temperature, the resistance offered by the gap between the electrodes G G may be materially reduced, so that there will be a minimum of damping in the oscillation circuit and hence a maximum of persistency. This I believe to be due chiefly to the fact that the conduction across the gap is maintained by ions and not by the heated metallic-dust vapors.

In cases where spheres or balls are employed I prefer to use balls of relatively large diameter. It is advantageous sometimes to coat the filament with oxids of the alkali metals.

In Fig. 2 I have shown an oscillating circuit in the nature of a singing-arc circuit in which the condenser is charged by a circuit containing a direct electromotive force and large ohmic resistance. When my discharger is to be used in such a circuit or in the regular singing-arc circuit, I prefer the form of discharger shown in Fig. 6, which form I find to be very efficient because of the exceedingly low resistance of the gap between the two heated filaments and to permit of a very regular spark-frequency. When the spark-frequency is equal to the frequency natural to the oscillation circuit and to that of the antenna system, in other words when the oscillations are continuous, it is of course very important that said spark frequency should be constant. In fact the difficulty of obtaining a constant frequency with a singing-arc circuit is, so far as I am aware, the chief reason why such circuits are not more generally used.

In the system of circuits shown in Fig. 5, electrical pulsations are developed in the circuit C L P H', the conductivity of the discharger shown in said system being unilateral.

It will be understood of course that in the systems shown in Figs. 5, 6 and 8, the dotted lines lead to a source of electromotive force which may be as shown either in Fig. 1 or in Fig. 2.

In Figs. 11, 12, 13 and 14, which represent electromagnetic wave radiating systems, the antenna is associated with the oscillating circuit S C I by means of the transformer M, the secondary of which is included in series with said antenna. In each of said figures there is included in series with said antenna, and preferably at a point having practically zero potential with earth, a discharger of one of the several types hereinbefore described. As set forth by me in prior Letters Patent No. 836,015, Nov. 13, 1906, variation produced in said antenna at said point will effect variations in the waves radiated therefrom. For this purpose the microphone $m$ connected in series with the battery B' may be employed as shown. In Figs. 11, 12 and 14, the circuit in which currents are varied by the operation of said microphone, is associated directly with the discharger while in Fig. 13 the said circuit is associated with the magnet 1 which is surrounded by the coil L'', so that the magnetic flux will alter the characteristics of the gaseous medium intervening between the electrodes J J. In Fig. 14, W is a grid, preferably of platinum wire connected to the antenna and interposed between the filament H and plate P.

In Figs. 13 and 14 the dotted lines lead to any suitable source of electromotive force.

It will be understood that many modifications may be made by those skilled in the art in the discharger which forms the subject matter of the present invention and that said discharger is capable of use in a variety of systems of circuits other than those which I have herein described. Accordingly I do not wish to limit myself either to the exact mechanical embodiments of said discharger or to the use of the same in any of the systems of circuits which for the purpose of more fully disclosing my invention I have specifically described.

I claim:

1. The combination with a source of electrical energy and a circuit including an electrical capacity, of a discharger comprising an evacuated vessel, two electrodes sealed therein, and means maintaining a heated gas in said vessel.

2. The combination with a source of electrical energy and a circuit including an electrical capacity, of a discharger comprising an evacuated vessel, two electrodes sealed therein and means for maintaining a condition of ionic conductivity between said electrodes.

3. The combination with a source of electrical energy and a circuit including an electrical capacity, of a discharger comprising an evacuated vessel, two electrodes sealed therein, a conducting member sealed within said vessel and located in proximity to said electrodes and means for heating said member.

4. The combination with a source of electrical energy and a circuit including an electrical capacity, of a discharger comprising an evacuated vessel, two electrodes sealed therein, a conducting member sealed within said vessel and located in proximity to said electrodes, means for heating said member, and magnetic means for deflecting toward said electrodes the ionic stream produced by so heating said member.

5. The combination with a source of electrical energy and a circuit including an electrical condenser, of a discharger comprising an evacuated vessel, two electrodes sealed therein and means maintaining a heated gas in said vessel.

6. The combination with a source of electrical energy and a circuit including an electrical condenser, of a discharger comprising an evacuated vessel, two electrodes sealed therein, and means for maintaining a condition of ionic conductivity between said electrodes.

7. The combination with a source of electrical energy and a circuit including an electrical condenser, of a discharger comprising an evacuated vessel, two electrodes sealed therein, a conducting member sealed within said vessel and located in proximity to said electrodes, and means for heating said member.

8. The combination with a source of electrical energy and a circuit including an electrical condenser, of a discharger comprising an evacuated vessel, two electrodes sealed therein, a conducting member sealed within said vessel and located in proximity to said electrodes, means for heating said member, and magnetic means for deflecting toward said electrodes the ionic stream produced by so heating said member.

9. An oscillation circuit including a condenser and the primary of a transformer in combination with a source of electrical energy a discharger for said condenser comprising an evacuated vessel, two electrodes sealed therein and means maintaining a heated gas in said vessel.

10. The combination with a source of electrical energy and an oscillating circuit including a condenser and the primary of a transformer, of a discharger for said condenser comprising an evacuated vessel having two electrodes sealed therein, and means for maintaining a condition of ionic conductivity between said electrodes.

11. An oscillation-circuit including a condenser and the primary of a transformer in combination with a source of electrical energy, a discharger for said condenser comprising an evacuated vessel, two electrodes sealed therein, a conducting member sealed within said vessel and located in proximity to said electrodes and means for heating said member.

12. An oscillation-circuit including a condenser and the primary of a transformer in combination with a source of electrical energy a discharger for said condenser comprising an evacuated vessel, two electrodes sealed therein, a conducting member sealed within said vessel and located in proximity to said electrodes, means for heating said member, and magnetic means for deflecting toward said electrodes the ionic stream produced by so heating said member.

In testimony whereof, I have hereunto subscribed my name this 24th day of December, 1906.

LEE DE FOREST.

Witnesses:
HANS W. GOETZE,
OSCAR F. SHAW, Jr.